United States Patent
White

(10) Patent No.: US 9,356,839 B2
(45) Date of Patent: May 31, 2016

(54) POLICY AGGREGATION FOR COMPUTING NETWORK HEALTH

(75) Inventor: Christopher J. White, Boston, MA (US)

(73) Assignee: RIVERBED TECHNOLOGY, INC., San Francisco, CA (US)

(*) Notice: Subject to any disclaimer, the term of this patent is extended or adjusted under 35 U.S.C. 154(b) by 238 days.

(21) Appl. No.: 13/315,619

(22) Filed: Dec. 9, 2011

(65) Prior Publication Data

US 2013/0151692 A1 Jun. 13, 2013

(51) Int. Cl.
| | |
|---|---|
| G06F 15/173 | (2006.01) |
| H04L 12/24 | (2006.01) |
| H04L 29/08 | (2006.01) |
| H04L 29/06 | (2006.01) |
| H04L 12/26 | (2006.01) |

(52) U.S. Cl.
CPC .............. *H04L 41/145* (2013.01); *H04L 29/06* (2013.01); *H04L 29/08072* (2013.01); *H04L 43/0817* (2013.01)

(58) Field of Classification Search
CPC .......................... H04L 29/08072; H04L 29/06
USPC ................................... 709/204–206, 224–226
See application file for complete search history.

(56) References Cited

U.S. PATENT DOCUMENTS

| | | | |
|---|---|---|---|
| 2003/0126254 A1* | 7/2003 | Cruickshank et al. ........ | 709/224 |
| 2005/0065753 A1* | 3/2005 | Bigus et al. .................... | 702/186 |
| 2008/0008094 A1* | 1/2008 | Gilfix ............................ | 370/235 |
| 2008/0109726 A1* | 5/2008 | Hurewitz ....................... | 715/717 |
| 2009/0016262 A1* | 1/2009 | Kulkarni et al. .............. | 370/328 |
| 2009/0089869 A1* | 4/2009 | Varghese .......................... | 726/7 |
| 2010/0064039 A9* | 3/2010 | Ginter et al. .................. | 709/224 |
| 2010/0194766 A1* | 8/2010 | Nakagawa ..................... | 345/543 |
| 2010/0332599 A1* | 12/2010 | Tapolcai et al. ............... | 709/205 |
| 2012/0014277 A1* | 1/2012 | Eckley, IV et al. ............ | 370/252 |
| 2012/0151362 A1* | 6/2012 | Narayanan ..................... | 715/736 |

* cited by examiner

*Primary Examiner* — Chris Parry
*Assistant Examiner* — Weiwei Stiltner
(74) *Attorney, Agent, or Firm* — Park, Vaughan, Fleming & Dowler LLP; Laxman Sahasrabuddhe

(57) ABSTRACT

A network health monitoring application computes aggregate reports of network health by combining status results from a group of segments to render a summary health status indicative of the entire group. Individual status values result from policies, which monitor various segments and metrics, or performance parameters (such as byte counts or retransmissions), concerned with providing a particular service. The policies form a hierarchy defining the general or specific nature of the segments included in the policy according to a range of attributes, in which the attributes define a scope of the segments included in the policy group. Multiple metrics gathered on each segment allow filtering by polices based on the metric, rather than the attribute (hierarchy level), thus lending a hierarchy filtering based on "vertical" slices of the hierarchy, allowing the user flexibility to filter on specific attribute values while still computing aggregate health at a particular attribute level.

17 Claims, 9 Drawing Sheets

POLICY AGGREGATION FOR COMPUTING NETWORK HEALTH

BACKGROUND

In a computing services environment, users gain access to services through networked computing entities, or components, interconnected by segments of the network. A component is a computing entity, such as a server, that is invoked to provide the service, and may interconnect with other servers for providing the service. Flow data derived from transmission activity over the segments is expressed as metrics of performance parameters for the segment. Network health is ascertainable by examining the flow data, and comparing the flow data to a baseline of acceptable or normal operating parameters. Deviation from the baseline indicates substandard status, or health, warranting further investigation. Network health status is often aggregated, or summarized, by grouping flow data covering a set of segments and components. Acceptable status for the aggregated group results in a rendering of an acceptable, or normal, health summary for all the segments in the group. Significant deviation from the baseline for the aggregated group is met with a "drill down" response, which narrows the group in an iterative manner to identify deviant segments.

SUMMARY

A network health monitoring application computes aggregate reports of network health by combining status results from a group of segments to render a summary health status indicative of the entire group. Individual status values result from policies, which monitor various segments and metrics, or performance parameters (such as byte counts, round trip time and retransmissions), concerned with providing a particular service. The policies form a hierarchy, typically represented as a tree, that ranges from general policies at the root to specific policies at the leaves. Each of the policies defines a status of the segments included in the policy based on a level in the hierarchy. Each level in the hierarchy corresponds to attributes, such as location, service, or performance category, such that the attributes define a scope of the segments included in the policy group. Each segment, however, corresponds to a plurality of metrics that are measurable on the segment. In contrast to conventional approaches, which analyze only a single composite health (status) value for each segment, configurations herein filter the polices based on the metric, allowing a drill-down analysis for only specific metrics of a group of segments, rather than generalizing individual segment status for each segment included in a policy group.

Operators may therefore drill down from a general level attribute (i.e. service or location) to individual metrics without narrowing the search field of segments considered in the "drilled down" (more granular) status. In graphical terms, the attributes define a vertical orientation of the hierarchy, while the metrics define a horizontal orientation of the hierarchy. While conventional drill-down approaches consider only lower levels of the hierarchy, filtering by metric, as defined herein, "prunes" certain branches of the hierarchy tree based on the filtered metric, such that the aggregate health status considers only specific metrics, but for a varied range of segments as defined by the attributes.

Configurations herein are based, in part, on the observation that network health monitoring tends to encompass a complex relation between many components and segments, and can be problematic to reduce or consolidate to a single discrete status value. Unfortunately, conventional approaches to network health and status monitoring suffer from the shortcoming that network status and health monitoring tends to examine a hierarchical arrangement of network status values in a horizontal arrangement, that is, formed by aggregating more specific groups of attributes into more general groups (levels) of the hierarchy, thus consolidating all metrics for a given level. The hierarchy then allows queries of general status (higher level) to be broken down into more specific queries to identify items of interest (often called "drilling down"). In a hierarchy that extends vertically by a number of attribute categories (attributes), each level depicts a set of segments (network nodes interconnections) that range in size from larger component groups down to smaller component groups. A graphical rendering of this drilling down approach amounts to horizontally "slicing" the hierarchy at the desired level of generality (i.e. segment group sizes). The conventional aggregate health of each group depends only on an overall, or global status for each segment, without regard to individual metrics encompassed by the segment. In other words, a single "bad" metric (throughput, RTX, RTT, resets) diminishes the status for the entire component or segment, without regard to the other metrics that may not be problematic Accordingly, configurations herein substantially overcome the above described shortcoming of drilling down by allowing aggregation based on specific metrics quantified within an attribute, rather on group generality (size) of the aggregated components. The metrics, as applied herein, metric is some measurable quantity that may be baselined (RTT, Bytes, Retransmissions), while the attributes refer to a static class of defining parameters (not a dynamic performance value) that differentiate the policies. For example, a policy may address the following attributes: service, segment, location, metric category, and metric. At one horizontal level in the tree the various nodes represent different values of the same attribute, e.g. attribute Location, values Boston and Cambridge. In graphical terms, therefore, the disclosed approach "slices" the hierarchy vertically, rather than horizontally, to allow an aggregate status based on only a subset of polices sharing the value of a particular attribute, rather than a collective "worst case" analysis based on all policies. Therefore, in the disclosed approach, individual problematic slices for a particular attribute value are identifiable, and the status of adequately performing attribute values are indicated as such, even though other values may be substandard. The disclosed approach, therefore, allows operator drill down based on attribute specificity, rather than group specificity, to identify the particular attribute value, and not merely the group of segments, that are contributing to an actionable (substandard) status.

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
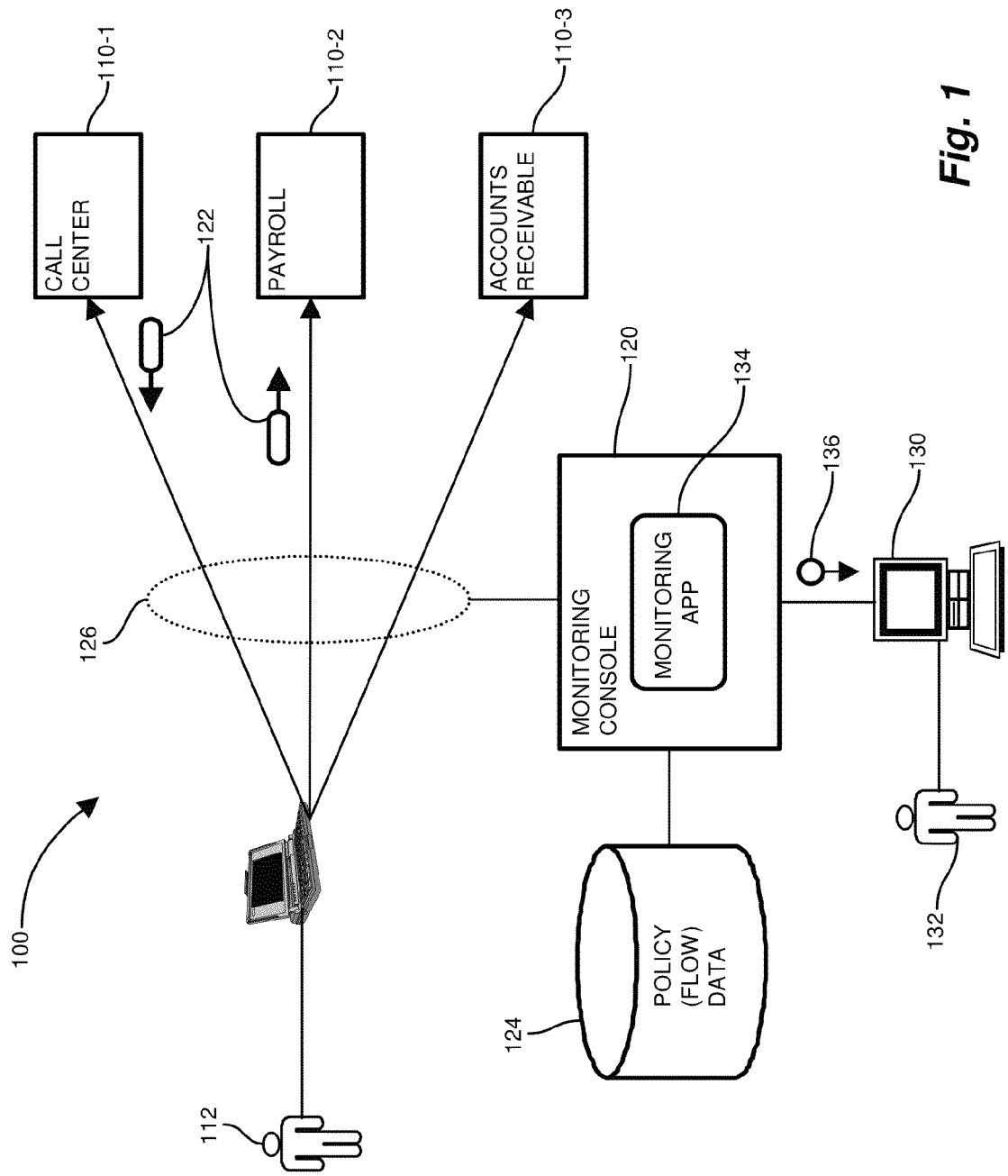
FIG. 1 is a context diagram of a computing services environment suitable for use with configurations of the invention.

Depicted below is an example configuration of a network responsive to the method for ascertaining and reporting service network health as disclosed herein. In the network services environment disclosed, a set of components define a service, and components within the service interact via the segments between the components. A segment is invoked by a client component for requesting a response from a server component. Each component (client or server), is a set of one or more hosts performing a similar function in the context of a service, i.e. the host may be clustered to provide parallel or increased throughput. Collectively, each individual service, such as payroll or call center, includes all the end users, servers, applications, and their interdependencies involved in delivering a business function to users via the network, along with policies defined to monitor their health. A segment may thus be defined as a tuple defining a client, application (port) and server. A policy includes a set of segments and a set of metrics to monitor. Base policies are directed to a specific metric on a particular segment, and aggregate polices are built from one or more other base or aggregate policies. Each of these base or aggregate policies may be compared to an analytic policy, or simply an analytic, which is a policy based on a normal baseline of network activity for one or more metrics on a segment. The analytics therefore provide a baseline of normal behavior from which the base or analytic policies may be compared to in order to assess network health. Analytics may be based on a variety of factors, and generally denote the deviation from normal activity worthy of further investigation and/or intervention.

The network services operator is typically interested in monitoring the health of a service or services which is based ultimately on the health of a set of low-level base policies that monitor all aspects of the service or services. In addition, it is desirable to provide individual details of the health of a service according to some common attribute such as the metric or location monitored. For example, all defined services have end users in Boston, San Francisco, and New York, as well as back end dependencies in the Data Center. For each location and back end dependency, the same set of metrics is monitored: Bandwidth, Response Time, and TCP Resets. Configurations herein render a summary health by-location across all services (regardless of metric), as well as a summary of health by metric across (regardless of location). In addition, the user is able to further restrict the view to a single location and metric, or any combination of attributes. The relationship between the health status provided in one view is directly related to the other views as well, using the same general rules for how health of lower-level policies is aggregated, or how substandard status values are propagated to more general attributes.

A set of low-level base policies monitor all aspects of a service or services. Each individual base policy provides a status indicator, such as a red/yellow/green policy health status for by monitoring a specific metric on a single segment and location of a one service. The policy aggregation tree (tree) as disclosed herein defines the mechanism for determining the aggregate health of the service by arranging the base policies into a hierarchical tree by attributes with the base policies as the leaves. Each higher level node in the tree (an aggregation policy) is associated with a different attribute: service, segment, location, metric category, and metric. All base policies that share the same set of higher level attributes above at are grouped under the same aggregation policy in the tree.

For example, "location Boston" is an attribute of every policy associated with Boston. Similarly, "metric bandwidth" is an attribute of all policies monitoring bandwidth. Multiple base policies will share the same location and metric, but may not be in the same segment or service and as such they cannot be grouped under the same node in the tree, leading to multiple "location Boston" nodes. Service is considered a higher-level attribute than location, and every service may have policies monitoring Boston. As such, there may be one "location Boston" node per service.

Configurations depicted further below perform, in the system for collecting and managing data, a method of computing aggregated values of a subset of data, including organizing data into a parent/child graph, selecting a criterion determined by at least one attribute, pruning the graph to remove any subgraphs that do not match the selected criterion and computing the aggregated values on the pruned graph. In conventional approaches, in contrast, the network operator must manually monitor the individual base-policies, examining each policy health individually. An aggregate health filtered according to metrics or attributes as disclosed herein is difficult to determine manually due to the large number of policies involved and the complexity in assessing multiple degrees of status indicators for individual policies.

The disclosed tree supports filtering on metric, metric category, location, segment, and service. Filtering prunes the tree but uses the same aggregation rules for health, yielding the health relative only to the items filtered and therefore agnostic to metrics outside the filter criteria. For example, computing the health of Boston across all services is achieved by filtering the tree on "Boston" and then using the aggregation policies to combine the health of the remaining base policies on up the tree.

An aggregate policy, therefore, is a policy based on the health of other policies, including user defined, analytic or other lower-level aggregate policies. Policy health is the state of a policy as defined by either comparing the actual metric to thresholds or the baseline to yield a health status, such as normal (Green), degraded (Yellow) or high (Red) status, or by aggregating the health of lower-level policies to determine a summary value. The hierarchy, in the example arrangement, takes the form of a service policy tree, which represents the collection of policies defined for a business service organized into a hierarchy for summarizing the health of the service from the lowest-level policies to the highest level aggregate policy. In the examples defined herein, the levels of the tree denote attributes, such as service, segment, location, metric category, and metric, following a progression from more general (service) to more specific (metric). The leaves of the tree denote atomic metric values for base policies, and the vertical branches define aggregation of the base policies to aggregate policies up the tree. "Pruning," as defined herein, refers to masking or eliminating branches of the tree from computation of health status, thus rendering health status based on selected leaves but not with respect to the pruned branches. Example metric categories and the constituent base metrics are shown in TABLE I.

TABLE I

| Category | Metric |
| --- | --- |
| Response Time | Response Time |
|  | Network RTT |
|  | Connection Duration |
|  | Server Delay |
| Throughput | Network Throughput |
|  | Application Throughput |
| Connections | New Connection Rate |
|  | Active Connection Rate |
|  | Connection Application Throughput |
| Efficiency | Retransmission Bytes |
|  | Reset Ratio |
| QoS | Service Violation Bandwidth |
|  | Degraded Service Bandwidth |

FIG. 1 is a context diagram of a computing services environment suitable for use with configurations of the invention. Referring to FIG. 1, in the computing services environment 100, end users 112 employ a computing device 114, such as a laptop, for accessing a plurality of services, such as call center management 110-1, payroll 110-2 and accounts receivable 110-3 (110 generally). In the environment 100, each service 110 employs components interconnected by segments, discussed further below in FIG. 3, for providing the service to the users 112. A monitoring console 120 employs a network interface 126 for gathering flow data 122 and storing the flow data 122 in a database 124. The network interface 126 to the service network gathers flow data indicative of network health, and may be any suitable sniffing or monitoring approach, as is known in the art, for nonintrusively examining packets transmitted across the network, such as a software agent, a physical interception node, or other suitable mechanism. A rendering device 130 is responsive to an executing monitoring application 134 for querying the flow data for generating status reports 136 indicative of the network health of the services 110.

Each policy in the system is assigned a health value, whether a low-level base policy or higher level aggregate policy. The health of a policy in general terms refers to the condition of the service with respect to the network components and metrics covered by that policy for a specified period of time, and is denoted by the health status, summarized above by red/yellow/green indications. Health changes over time and the history of a policy's health may be tracked.

Figure 4:
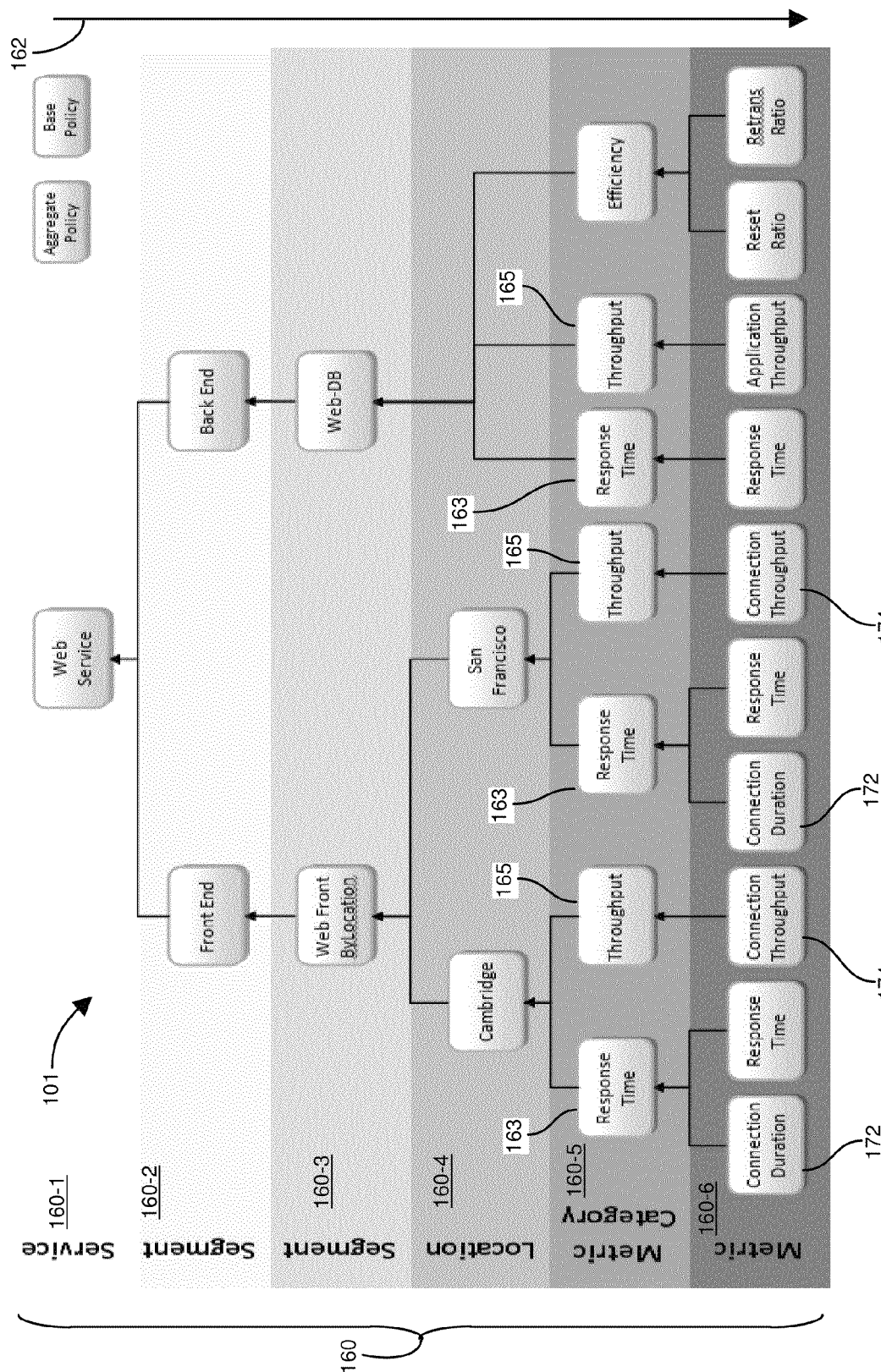
FIG. 4 shows an example hierarchy of policies for a service as in FIG. 3.

In the example arrangement, the management console 120 displays the health of a policy as one of three values: normal (green), degraded (yellow) and high (red). Other mnemonics and colors may be employed to denote metrics outside the expected or normal range. The health of low-level policies is determined by the subsystems implementing the analytic and user-defined policies directly. The health of aggregate policies is determined via aggregation rules that define how to combine the health from the policies at a more granular (lower) level in the aggregation tree 101 (FIGS. 4 and 5 below). Policy aggregation as defined herein is the process of determining the health of an aggregate policy from the set of policies that are direct children of the aggregate policy in the aggregation tree. An aggregation rule is assigned to each aggregate policy that specifies how the health is computed from the child policies. Possible aggregation rules include: best child—the health of the aggregate policy is taken from the best child, and worst child—the health is taken from the worst child.

Figure 2:
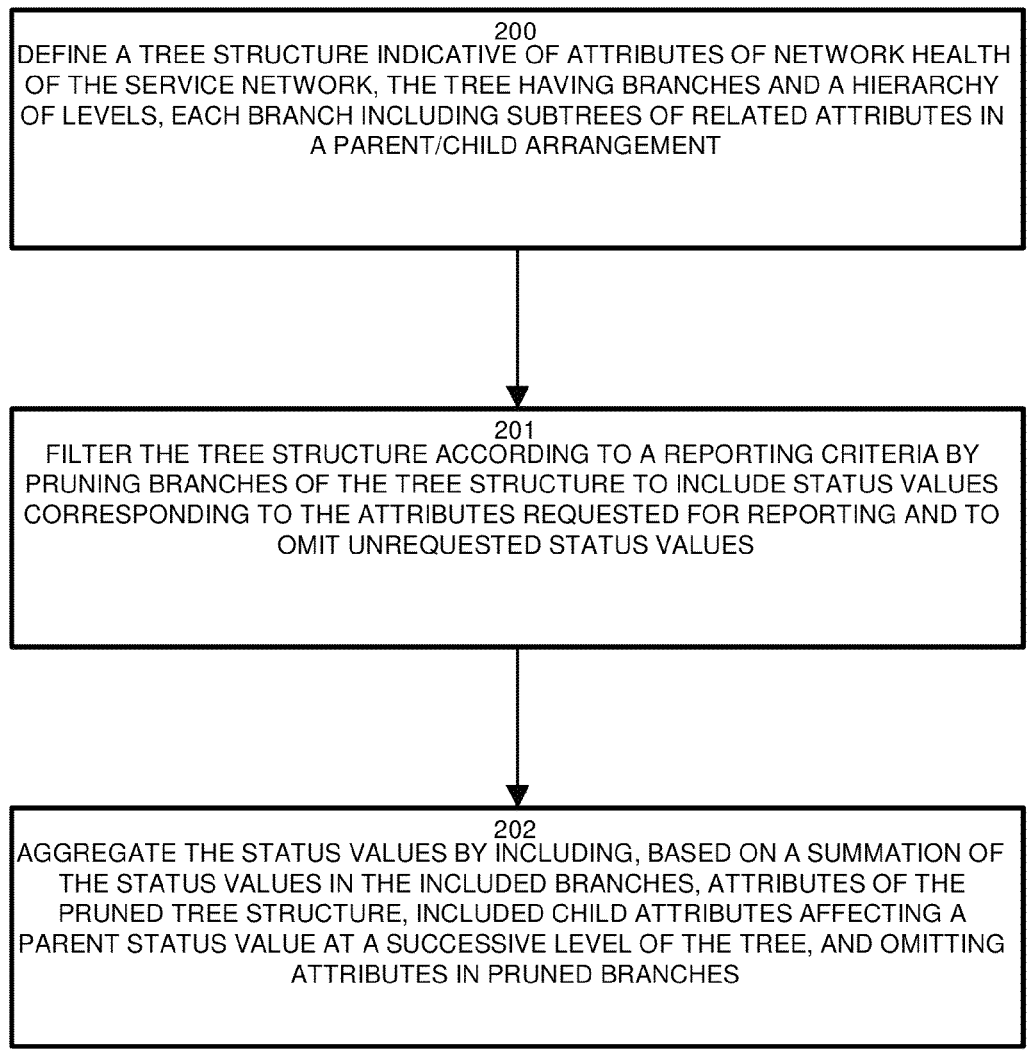
FIG. 2 is a flowchart of policy aggregation in the environment of FIG. 1

FIG. 2 is a flowchart of policy aggregation in the environment of FIG. 1. Referring to FIGS. 1 and 2, in the service network 100 having components 140 interconnected by segments 150 (FIG. 3, below) for providing services to end users 112, the method of reporting network health as defined herein includes, at step 200, defining a tree structure indicative of attributes of network health of the service network, such that the tree has branches and a hierarchy of levels, in which each branch includes subtrees of related attributes in a parent/child arrangement. Branches therefore further subdivide attributes, such as location and metric category, into base metrics defining individual values. The monitoring console 120 filters the tree structure (hierarchy) 101 according to a reporting criteria by pruning branches of the tree structure 101 to include status values corresponding to the attributes requested for reporting, and also to omit unrequested status values of the branches pruned away, as depicted at step 201. The monitoring console 120 aggregates the status values by including, based on a summation of the status values in the included (unpruned) branches, attributes of the pruned tree structure, such that included child attributes affect a parent status value at a successive level of the tree, and for omitting attributes in pruned branches, as depicted at step 202. Thus, the included status values are imparted "up" the tree to a parent status values for contributing to a policy status of a more general attribute (such as metric category, location, or service), while unincluded metrics of pruned branches do not factor into the aggregate status values.

Figure 3:
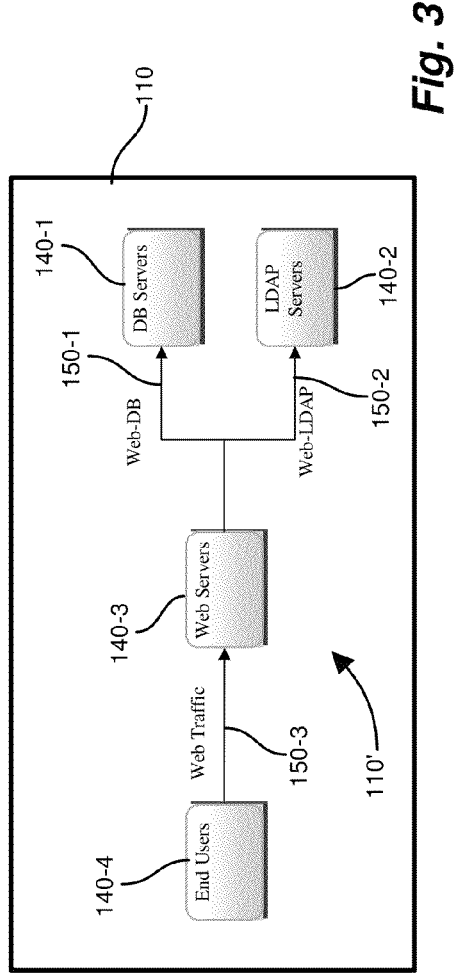
FIG. 3 is a block diagram of components and segments in a service as in FIG. 1.

FIG. 3 is a block diagram of components and segments in a service as in FIG. 1. Referring to FIGS. 1 and 3, a service map 110' of a service 110 is shown. A set of components 140-1 . . . 140-4 define the service, which in the example arrangement is an LDAP (Lightweight Data Application Protocol) service. The service 110 includes DB servers 140-1, LDAP servers 140-2, web servers 140-3, and end users 140-4 (140 generally). The components 140, each of which represents a physical cluster of one or more physical nodes (processing devices) for fulfilling a specific function of the servers, interconnect and communicate via segments 150, including a web-db segment 150-1, a web LDAP segment 150-2 and a web traffic component 150-3 (150 generally). In the example arrangement, the flow data 122 includes tuples indicating a segment 150, defined by a client component 140 and a server component, and a server port denoting the corresponding application, typically the port (i.e. "well known" port as is typical in network communications) on which the server is listening and to which clients connect. Since each component 140 may refer to multiple physical nodes, the port indicates the specific function that the component is fulfilling on behalf of the client, rather than simply dumping network addresses reflected in packets.

A caveat exists with respect to the end users component 140-4, discussed further below. Since end users 112 are employ a variety of rendering devices 114 and may be dispersed across a broad geographic base, an end user component 140-4 generally refers to a set of users 112 at a specific geographic location, such as state, city, or facility, as otherwise the number of components 140 representative of end users 112 could become unwieldy.

FIG. 4 shows an example hierarchy 101 of policies for a service as in FIG. 3. In larger installations, multiple services may be represented such that the full policy aggregation tree has one additional level "Overall" which has a single policy representing the health across all services. The children of the Overall attribute are the individual service attribute polices, such as the "Web Service" on level 160-1. Referring to FIGS. 3 and 4, the hierarchy 101 includes attributes 160, each defining a level 162 of the hierarchy 101. The attributes 160, in the example arrangement, correspond to the levels 162 and include the service 160-1, segment tiers 160-2, segment 160-3, group 160-4, metric category 160-5 and metric 160-6. Each of the levels 162 includes policies 164 that specify the information that is to be monitored for each segment, and include base policies, referring to a single metric, and aggregate policies, that are a summation of multiple base policies. In the example shown, base policies are for individual metrics on level 160-6 and attributes (levels 160-1 . . . 160-5) corresponding to the remaining policies are aggregations of the base policies.

In the example arrangement, the monitored attributes 160 range from a more general set defined by an entire service 160-1, down to the base policies for individual metrics 160-6. The segment tier 160-2 denotes front end (i.e. end user) segments 150, and back end segments 150, generally the remaining components (segments) "behind" the web server 140-3, denoted by the segment 160-3 attribute. As indicated above, the front end segment 160-3 defines front end segments to each location 160-4 depicting a group of users. The user groups generally denote geographical distribution of users, as appropriate to the enterprise or organization being monitored. For example, for a company headquartered in San Francisco and having a second facility in Cambridge, the geographical entities San Francisco and Cambridge are an appropriate demarcation to the groups of end users 112. In a company having, for example, multiple sites in Boston and a satellite location in Alaska, designations such as "financial district", "back bay", "north end" and "Alaska" might be appropriate. The back end segments would not benefit from such a geographic breakout, and thus are broken down directly into metric category 160-5 and individual metrics 160-6.

Metric category 160-5 denotes metrics that may be related or otherwise queried together, such as efficiency, throughput, and response time, and these categories further include one or more individual metrics 160-6, defined by base policies including connection duration and response time metrics under the response time 163 metric category 160-5, and connection throughput under the throughput 165 metric category 160-5. Other metrics may include round trip time (RTT), byte count (bytes transmitted), packet count, retransmissions (RTX) and resets, as well as others.

Figure 5A:
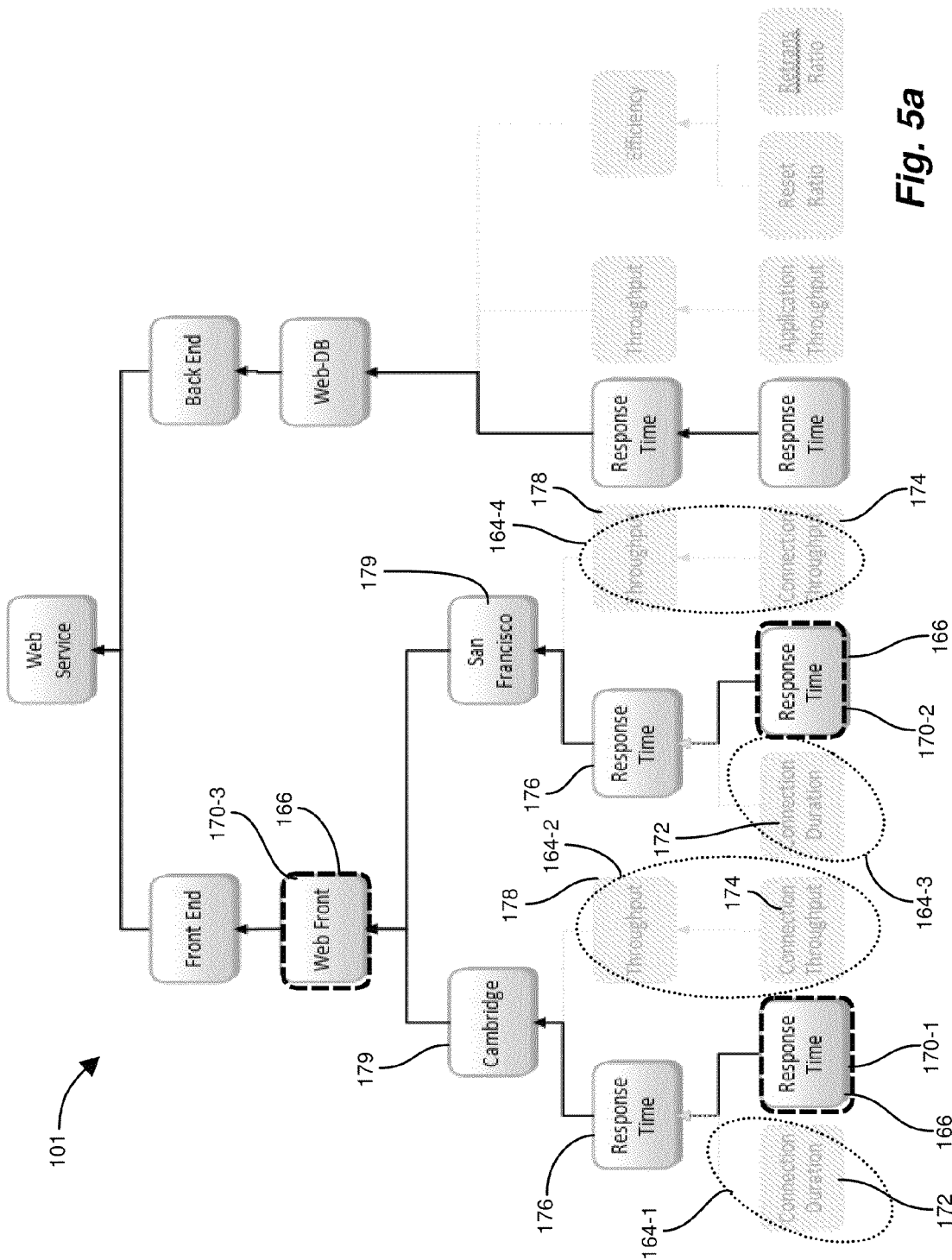
FIGS. 5a and 5b show aggregation of the policies of FIG. 4.
Figure 5B:
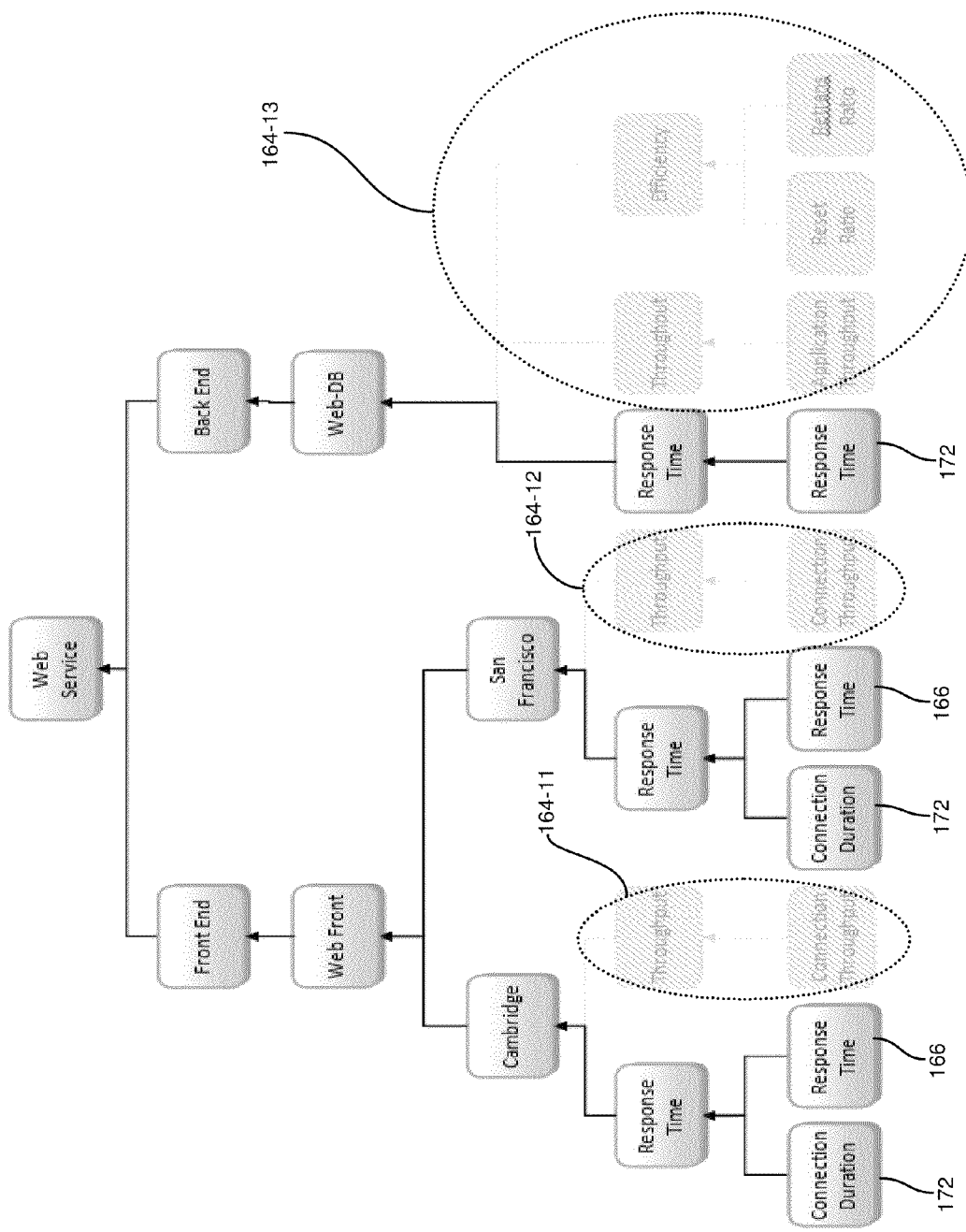

FIGS. 5a and 5b show aggregation of the policies of FIG. 4. Referring to FIGS. 4, 5a and 5b, an example query responsive to a health status report is shown. The example query of FIG. 5a requests the network health status for the front end segment tier (attribute 160-2) for the response time metric. Policies 170-1 and 170-2 are directed to gathering flow data for the attribute front end 160-3 segment. Accordingly, network health is evaluated using the base policies 170-1 and 170-3 contributing to aggregate policy 170-3, as shown by dotted lines 166. Considering only flow data 122 pertaining to response time metrics 170-1, 170-2 for front end segment 170-3 attributes involves masking, or pruning, branches 164-1, 164-2, 164-3 and 164-4 (164 generally). Therefore, attributes 160 pertaining to the base policies for connection duration 172 and connection throughput 174 are not considered. Intervening aggregate policies 176 and 179 are retained because particular configurations may employ additional aggregation rules that affect the health, even though each has only a single child after pruning the Connection Duration 172 and Connection Throughput 174 base policies. For example, Cambridge may have an aggregation rule such that "If response time is red or yellow, Cambridge is yellow". If the aggregation rules simply drop Cambridge and move Response Time 170-1 as a direct child of 170-3, such a rule would be lost. As depicted graphically in FIG. 4, such filtering is expressed by vertical subdivisions of the hierarchy 101, or pruning, of the branches corresponding to policies not sought by the query. Conventional drilling down examines only successive attribute levels, thus would not encompass filtering only a subset of policies on the same level, for example the health status of response time 170-1, 170-2 but not connection duration 172 or connection throughput 174.

FIG. 5b shows the entire web service filtered on the metric category attribute 160-5 for response time. The response time aggregate policy 163 encompasses the base policies for connection duration 172 and response time 166, and therefore prunes branches 164-11, 164-12 and 164-13.

Therefore, filtering as defined herein includes pruning branches of the hierarchy to remove branches leading to leaves of filtered metrics, and considering only branches leading to leaves of requested metrics. Conventional approaches perform filtering at the attribute level, horizontally subdividing the hierarchy, and therefore include all metrics of a level for which an attribute is requested.

Figure 6:
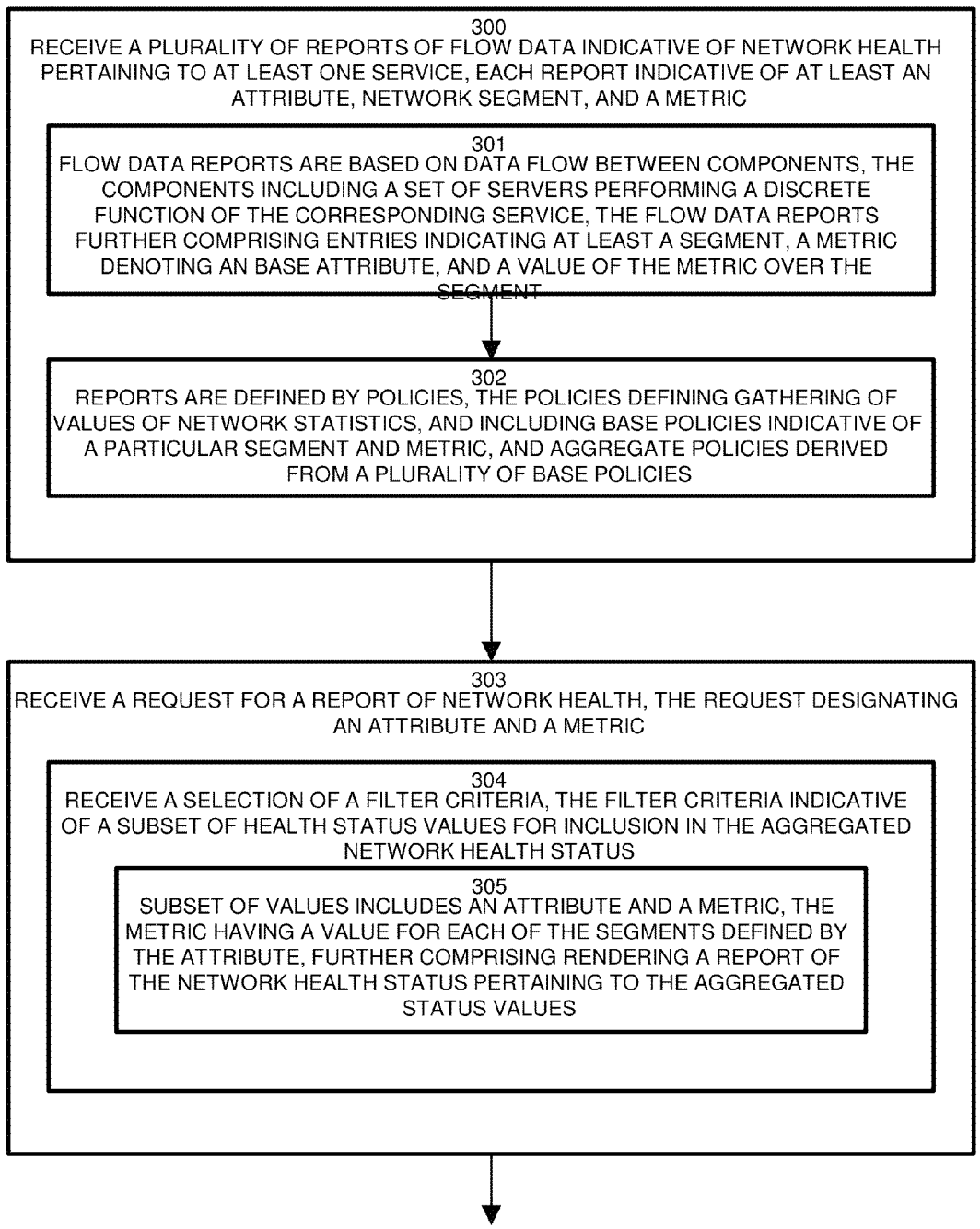
FIGS. 6-8 are a flowchart of aggregation policies as in FIG. 4.
Figure 7:
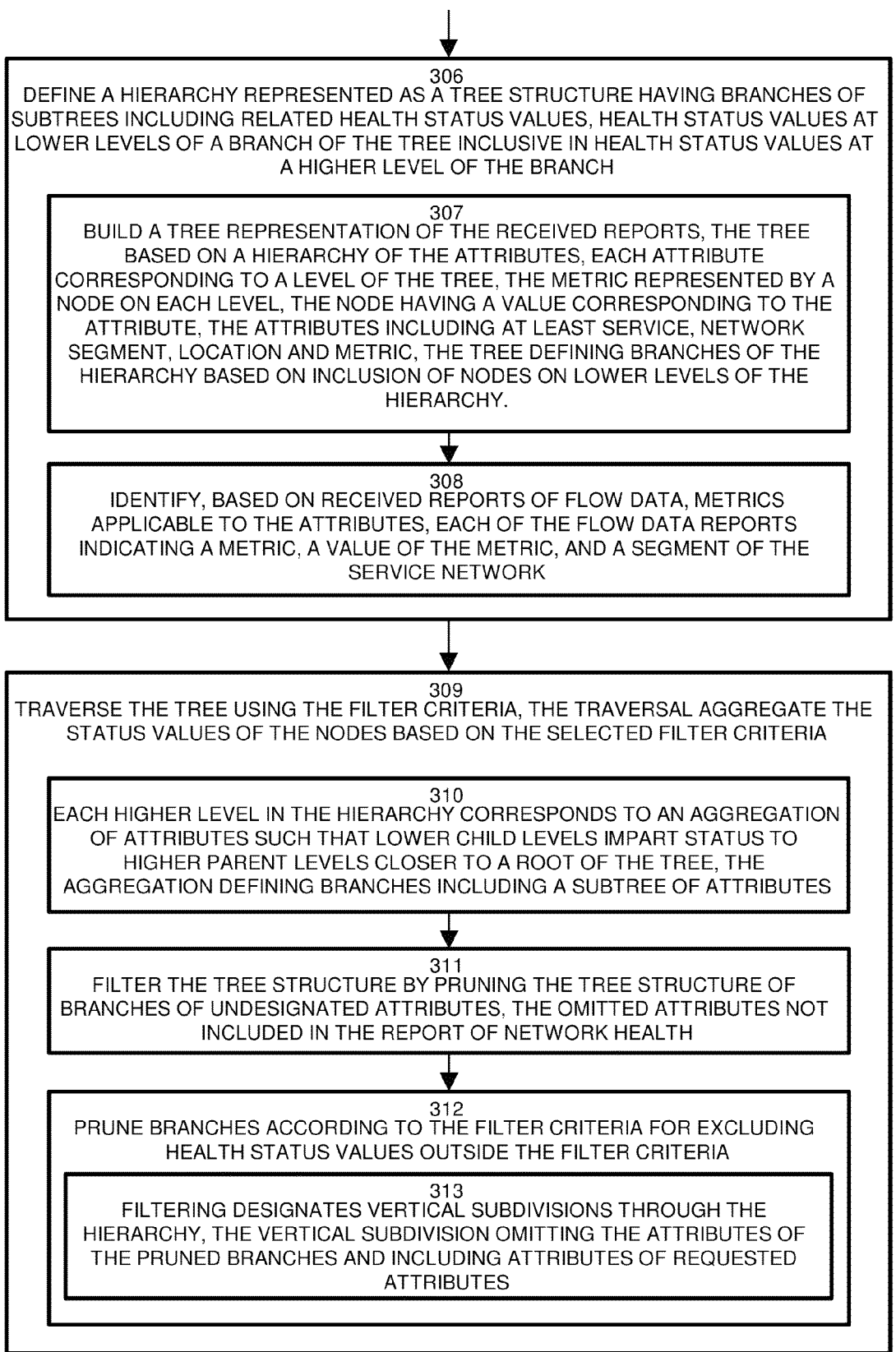
Figure 8:
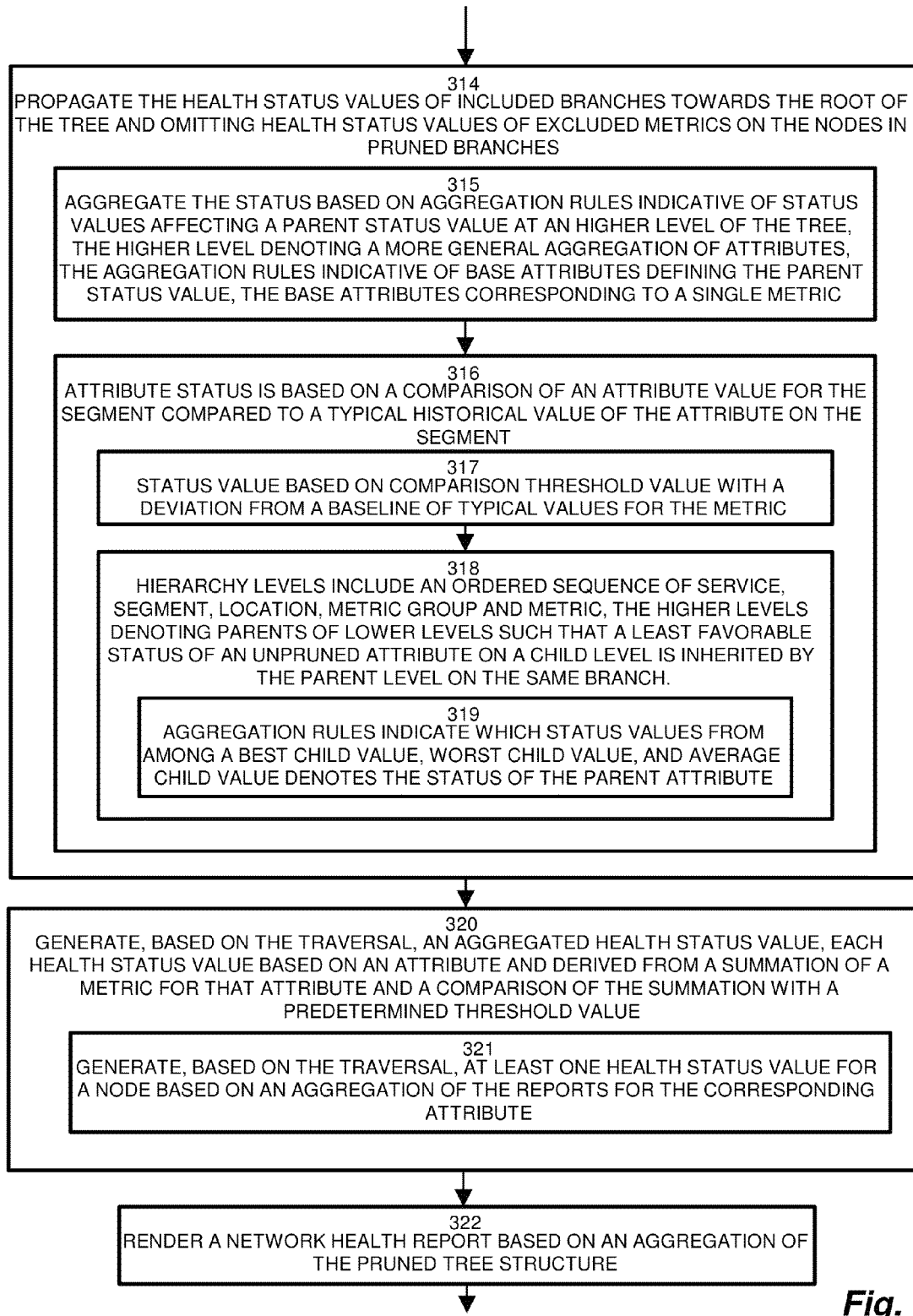

FIGS. 6-8 are a flowchart of aggregation policies as in FIG. 4. Referring to FIGS. 1 and 3-8, at step 300, the monitoring console 120 receiving a plurality of reports of flow data 122 indicative of network health pertaining to at least one service 110. Each report is indicative of at least an attribute, network segment, and a metric. The attribute, as shown in FIG. 4, defines a level of the hierarchy, and thus includes 1 or more metrics. Base policies, on the metric level 160-6, include a single metric, while aggregate policies, concerned with attributes on levels 160-1 . . . 160-5, may include multiple metrics (values), depending on filtering. The metric corresponds to a performance value on the segment; typical metrics quantify retransmissions (RTX), byte count, packet count, round trip time (RTT) and resets. The flow data 122 reports are based on the data flow between the components 140, in which the components 140 include a set of one or more servers performing a discrete function of the corresponding service, as depicted at step 301. The flow data reports are further defined by entries indicating at least a segment 150, a metric denoting a base attribute 160-6, and a value of the metric over the segment 150, as shown at step 302. In the example arrangement, the reports include values of metrics gathered based on the policies, and include base policies indicative of a particular segment and metric, and aggregate policies derived from a plurality of base policies. Since each report includes a single value based on the metric being measured, the policies indicate which reports to gather and aggregate (add) values. The policy therefore defines the attribute by specifying the scope of the policy, such as a metric, metric category, location or service, and the individual metrics assess the base attributes 160-6 and other attributes 160-1 . . . 160-5 determined from an aggregation of the base attributes.

Upon an operator 132 need for a network status, the monitoring console 120 receives a request for a report of network health, such that the request designates an attribute and a metric, as disclosed at step 303. This includes receiving a selection of a filter criteria indicative of a subset of health status values for inclusion in the aggregated network health status, as shown at step 304. The subset of values includes an attribute and a metric, in which the metric has a value for each of the segments defined by the attribute, as depicted at step 305.

To compute the network health based on the requested filter criteria, the monitoring console 120 defines a hierarchy represented as a tree structure 101 having branches of subtrees 164 including related health status values, such that health status values at lower levels of a branch of the tree are inclusive in health status values at a higher level of the branch, as shown at step 306. Higher tree levels denote more general attributes, and define, in descending order, the service, segment, location, metric category and metric. Status processing includes building the tree representation 101 of the received reports, the tree being based on a hierarchy of the attributes, in which each attribute corresponds to a level of the tree, and in which the values corresponding to the attribute are represented by a node on each level 162, as disclosed at step 307. Each tree 101 node has a value corresponding to the attribute 160, in which the attributes include service, segment, location and metric, such that the tree 101 defines branches 164 of the hierarchy based on inclusion of nodes on lower levels of the hierarchy. Building the tree structure 101 further includes identifying, based on received reports of flow data 122, metrics applicable to the attributes, in which each of the flow data reports indicates a metric, a value of the metric, and a segment of the service network, as shown at step 308.

The monitoring console 120 traverses the tree 101 using the filter criteria, such that the traversal aggregates the status values of the nodes based on the selected filter criteria, as shown at step 309. Each higher level in the hierarchy 101 corresponds to an aggregation of attributes 160 such that lower child levels 162 impart status to higher parent levels 162 closer to a root of the tree, and the aggregation defines branches 164 including a subtree of attributes based on the filtering criteria, as shown at step 310. The traversal filters the tree structure 101 by pruning the tree structure of branches that do not match the filter criteria, as depicted at step 311. A corresponding tree traversal may therefore proceed as follows: the lowest level base policies of the tree (i.e. individual metrics, in the example shown) have all the attributes values walking from the base policy up to the root of the tree. Filtering occurs by omitting (filtering) only the base policies first based on the criteria, dropping any base policies that don't match the requested criteria. Once that is done, prune any branches to nodes that have no base policies left. The traversal therefore prunes branches according to the filter criteria for excluding health status values outside the filter criteria, and therefore omitting values for which status was not requested, as depicted at step 312. The filtering effectively designates vertical subdivisions through the hierarchy, the vertical subdivision including attributes of requested attributes, as shown at step 313. Conventional filtering, or drilling down, performs only generalization of tree levels by performing horizontal subdivision of the tree, which does not allow for aggregation of some attributes but not others.

Since status values of lower, more granular attributes are imparted to higher, more general attributes, the monitoring application 134 propagates the health status values of included branches towards the root of the tree 101 and omits health status values of excluded metrics on the nodes in pruned branches, as depicted at step 314. Propagation includes aggregating the status based on aggregation rules indicative of status values affecting a parent status value at an higher level of the tree, such that the higher level denotes a more general aggregation of attributes, and in which he aggregation rules are indicative of base attributes defining the parent status value, of which the base attributes correspond to a single metric, as disclosed at step 315. The attribute status for the various attribute levels is based on a comparison of a metric value for the segment compared to a typical historical value of the metric on the segment, as disclosed at step 317. In the example arrangement, the status value based on comparison threshold value with a deviation from a baseline of typical values for the metric, as depicted at step 318. Any suitable comparison may be employed, as discussed below, however health status is generally indicative of whether current operating parameters (as defined by the metrics) deviate substantially from established norms of acceptable operation. The hierarchy levels 162 include an ordered sequence of service, segment, location, metric group and metric; the higher levels denote parents of lower levels such that the status of an unpruned attribute on a child level is propagated to the parent level. In a particular configuration, aggregation rules may indicate which status values from among a best child value, worst child value, and average child value denotes the status of the parent attribute, as depicted at step 319.

The monitoring console 120 generates, based on the traversal, an aggregated health status value, such that each health status value is based on an attribute and derived from a summation of a metric for that attribute and a comparison of the summation with a predetermined threshold value, as shown at step 320. The predetermined threshold value represents previously gathered baseline statistics for normal, compromised, and insufficient performance (health). Each metric has such a baseline value for comparison. Depending on summation rules, aggregated health status values look at each value for a metric included in a policy, which generally adds the metric values from lower, subordinate nodes such as from base policies. This includes generating, based on the traversal, at least one health status value for a node based on an aggregation of the reports for the corresponding attribute, as depicted at step 321. The monitoring console 120 then renders a network health report based on an aggregation of the pruned tree structure on the operator display 130, as depicted at step 322.

Figure 9:
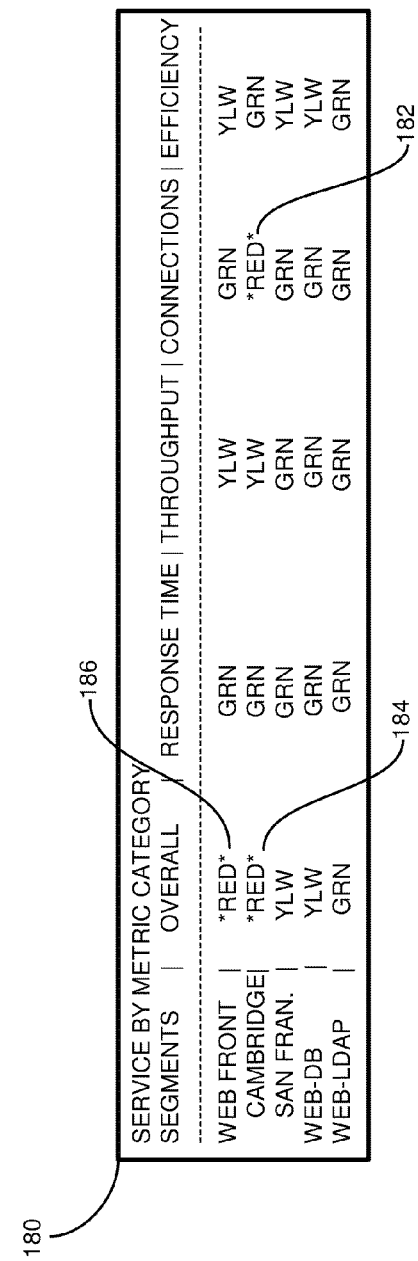
FIG. 9 shows an example GUI rendering of an aggregation report 180 as computed in FIGS. 6-8.

FIG. 9 shows an example GUI rendering of an aggregation report 180 as computed in FIGS. 6-8. For the report, the policies aggregate by imparting the most severe (worst) status form child nodes, as follows. The metric category for connections exhibits a *RED* status for the Cambridge location 182. Presumably this is resulting from a *RED* status from a constituent base metric in the connections category, as shown in TABLE I. This being the most severe status, is imparted to the overall policy for the Cambridge location 184. As the Cambridge location is a child node of the web front segment, the *RED* status is likewise aggregated to the web front segment overall health 186. Different policies may aggregate the most favorable status to the parent node, or may allow a tolerance of one or two deficient status values before imparting the status value to the aggregate status. Additionally, any suitable rendering labels may be employed; for example a range of numbers or percentages, or various color schemes may, be employed in an actual rendering, rather than the color labels employed here for clarity.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of service network discovery has been particularly shown and described with references to embodiments thereof, it will be understood by those skilled in the art that various changes in form and details may be made therein without departing from the scope of the invention encompassed by the appended claims.

What is claimed is:

1. In a service network having components interconnected by segments for providing services to end users, a method of reporting network health comprising:
    defining a hierarchical tree structure indicative of a policy aggregation tree, the tree having branches and a hierarchy of levels, each branch including sub-trees in a parent/child arrangement, wherein each higher level in the hierarchy corresponds to an aggregation of attributes such that lower child levels impart status to higher parent levels closer to a root of the tree, the aggregation defining branches including a sub-tree of attributes;
    receiving a request for a report of network health, the request designating one or more attributes, wherein at least one of the one or more designated attributes is a metric category attribute, or a metric attribute;
    filtering, by computer, the tree structure according to a reporting criteria included in the request by pruning branches of the tree structure to include branches of the tree corresponding to status values of attributes that are requested for reporting, and to omit branches of the tree corresponding to unrequested status values, wherein filtering designates vertical subdivisions through the hierarchy, the vertical subdivision omitting the attributes of the pruned branches and including attributes of requested attributes; and
    aggregating the status values by including, based on a summation of the status values in the included branches, attributes of the filtered tree structure, wherein child attributes affecting a parent status value at a successive level of the filtered tree are included, and wherein status values in pruned branches are omitted.

2. The method of claim 1 wherein building the tree structure further includes identifying, based on received reports of flow data, metrics applicable to the attributes, each of the flow data reports indicating a metric, a value of the metric, and a segment of the service network.

3. The method of claim 2 wherein the flow data reports are based on data flow between components, the components including a set of servers performing a discrete function of the corresponding service, the flow data reports further comprising entries indicating at least a segment, a metric denoting a base attribute, and a value of the metric over the segment.

4. The method of claim 1 further comprising:
    rendering a network health report based on an aggregation of the filtered tree structure.

5. The method of claim 1 further comprising aggregating the status based on aggregation rules indicative of status values affecting a parent status value at a higher level of the tree, the higher level denoting a more general aggregation of attributes, the aggregation rules indicative of base attributes defining the parent status value, the base attributes corresponding to a single metric.

6. The method of claim 5 wherein the attribute status is based on a comparison of an attribute value for the segment compared to a typical historical value of the attribute on the segment.

7. The method of claim 5 wherein the status value is based on comparison threshold value with a deviation from a baseline of typical values for the metric.

8. The method of claim 5 wherein the hierarchy levels include an ordered sequence of service, segment, location, metric group and metric, the higher levels denoting parents of lower levels such that the status of an un-pruned attribute on a child level is accounted for by the parent level on the same branch.

9. The method of claim 8 wherein aggregation rules indicate which status values from among a best child value, worst child value, and average child value denotes the status of the parent attribute.

10. In a service network having a plurality of components interconnected by segments, each segment having metrics defining the status of the segment, a non-transitory computer-readable storage medium including computer program logic encoded as instructions thereon for performing a method of aggregating network health status comprising:
    defining a hierarchy represented as a tree structure indicative of a policy aggregation tree, the tree structure having branches of sub-trees including related health status values, health status values at lower levels of a branch of the tree inclusive in health status values at a higher level of the branch, wherein each higher level in the hierarchy corresponds to an aggregation of attributes such that lower child levels impart status to higher parent levels closer to a root of the tree, the aggregation defining branches including a sub-tree of attributes;
    receiving a request for a report of network health, the request designating one or more attributes, wherein at least one of the one or more designated attributes is a metric category attribute, or a metric attribute;
    traversing the tree using the filter criteria included in the request, the traversal aggregating the status values of the nodes based on the selected filter criteria by:
        pruning branches according to the filter criteria for excluding health status values outside the filter criteria; and propagating the health status values of included branches towards the root of the tree and omitting health status values of excluded metrics on the nodes in pruned branches, wherein the traversal filters the tree structure by designating vertical subdivisions through the hierarchy, the vertical subdivision omitting the attributes of the pruned branches and including attributes of requested attributes; and generating, based on the traversal, an aggregated health status value, each health status value based on an attribute and derived from a summation of a metric for that attribute and a comparison of the summation with a predetermined threshold value.

11. The method of claim 10 further comprising receiving a plurality of reports of flow data indicative of network health pertaining to at least one service, each report indicative of at least an attribute, network segment, and a metric.

12. The method of claim 11 further comprising building a tree representation of the received reports, the tree defining branches of the hierarchy based on inclusion of nodes on lower levels of the hierarchy.

13. The method of claim 10 wherein the subset of values includes an attribute and a metric, the metric having a value for each of the segments defined by the attribute, further comprising rendering a report of the network health status pertaining to the aggregated status values.

14. The method of claim 10 further comprising generating, based on the traversal, at least one health status value for a node based on an aggregation of the reports for the corresponding attribute, each health status value based on an attribute and derived from a summation of a metric for that attribute and a comparison of the summation with a predetermined threshold value.

15. The method of claim 14 wherein the reports are defined by policies, the policies defining gathering of values of network statistics, and including base policies indicative of a particular segment and metric, and aggregate policies derived from a plurality of base policies.

16. In a service network having components interconnected by segments for providing services to end users, a monitoring console including a server for reporting network health comprising:

an interface to the service network for gathering flow data indicative of network health;

a processor;

a data base responsive to the processor for storing data defining a hierarchical tree structure indicative of a policy aggregation tree, the tree having branches and a hierarchy of levels, each branch including sub-trees in a parent/child arrangement, wherein each higher level in the hierarchy corresponds to an aggregation of attributes such that lower child levels impart status to higher parent levels closer to a root of the tree, the aggregation defining branches including a sub-tree of attribute;

a monitoring application configured to receive a request for a report of network health, the request designating one or more attributes, wherein at least one of the one or more designated attributes is a service attribute, a metric category attribute, or a metric attribute, the monitoring application to filter the tree structure according to a reporting criteria included in the request by pruning branches of the tree structure to include branches of the tree corresponding to status values of attributes that are requested for reporting, and to omit branches of the tree corresponding to unrequested status values, wherein filtering designates vertical subdivisions through the hierarchy, the vertical subdivision omitting the attributes of the pruned branches and including attributes of requested attributes, the monitoring application for aggregating the status values by including, based on a summation of the status values in the included branches, attributes of the filtered tree structure, wherein child attributes affecting a parent status value at a successive level of the filtered tree are included, and wherein attributes in pruned branches are omitted.

17. The server of claim 16, wherein the monitoring application is further configured to:

render a network health report based on an aggregation of the filtered tree structure.

* * * * *